(12) United States Patent
Morrissette

(10) Patent No.: US 6,801,021 B2
(45) Date of Patent: Oct. 5, 2004

(54) VOLTAGE REGULATOR HAVING ENHANCED REGULATION OVER VEHICLE CHARGING SYSTEM

(75) Inventor: Gary E. Morrissette, Orlando, FL (US)

(73) Assignee: Wetherill Associates, Inc., Royersford, PA (US)

( * ) Notice: Subject to any disclaimer, the term of this patent is extended or adjusted under 35 U.S.C. 154(b) by 68 days.

(21) Appl. No.: 10/314,883

(22) Filed: Dec. 9, 2002

(65) Prior Publication Data

US 2004/0108840 A1 Jun. 10, 2004

(51) Int. Cl.[7] ................................................ H02P 9/02
(52) U.S. Cl. ......................... 322/28; 322/25; 323/281
(58) Field of Search ............................. 322/25, 27, 28, 322/100; 323/234, 281

(56) References Cited

U.S. PATENT DOCUMENTS

| | | | |
|---|---|---|---|
| 4,438,385 A | 3/1984 | Sato et al. ................... 322/28 |
| 4,659,977 A | 4/1987 | Kissel et al. ................. 320/64 |
| 4,682,044 A | 7/1987 | Hotate et al. ............ 290/40 B |
| 5,280,232 A * | 1/1994 | Kohl et al. ................... 322/23 |
| 5,298,851 A | 3/1994 | DeNardis ..................... 322/28 |
| 5,583,420 A * | 12/1996 | Rice et al. .................... 322/25 |
| 5,617,011 A * | 4/1997 | Hammer et al. ............. 322/28 |
| 5,801,516 A * | 9/1998 | Rice et al. .................... 322/37 |
| 5,907,233 A * | 5/1999 | Jabaji ......................... 322/28 |
| 6,064,186 A | 5/2000 | Pierret et al. ................ 322/28 |
| 6,218,814 B1 * | 4/2001 | Kohl et al. ................... 322/28 |
| 6,222,349 B1 * | 4/2001 | LeRow et al. ............... 322/34 |
| 6,331,762 B1 | 12/2001 | Bertness ..................... 320/134 |
| 6,359,442 B1 | 3/2002 | Henningson et al. ....... 324/426 |
| 6,486,638 B1 * | 11/2002 | Sumimoto et al. ........... 322/28 |
| 6,534,959 B1 * | 3/2003 | Anderson et al. ............ 322/28 |
| 6,700,356 B1 * | 3/2004 | Dorn ........................... 322/44 |
| 2002/0089866 A1 | 7/2002 | Keim et al. .................. 363/89 |

FOREIGN PATENT DOCUMENTS

| | | | |
|---|---|---|---|
| EP | 0 378 075 | 7/1990 | ............ H02P/9/30 |
| EP | 0 887 920 | 12/1998 | ............ H02P/9/30 |
| EP | 1 098 420 | 5/2001 | ............ H02J/7/24 |
| WO | 02/33816 A2 | 4/2002 | ............ H02P/6/00 |

* cited by examiner

Primary Examiner—Nicholas Ponomarenko
(74) Attorney, Agent, or Firm—Allen, Dyer, Doppelt, Milbrath & Gilchrist, P.A.

(57) ABSTRACT

A voltage regulator is part of a vehicle charging system having an alternator or generator and field winding and connected to a vehicle battery and devices for supplying a voltage and powering vehicle devices. The voltage regulator includes a microcontroller operative for monitoring output voltages representative of monitored load changes within the vehicle. A power output circuit is operatively connected to the microcontroller and connects to a field winding. The microcontroller is operative for changing the field duty cycle of the generator or alternator by turning ON and OFF the power output circuit in a predetermined manner as established by the microcontroller based on monitored load changes.

40 Claims, 3 Drawing Sheets

VOLTAGE REGULATOR HAVING ENHANCED REGULATION OVER VEHICLE CHARGING SYSTEM

FIELD OF THE INVENTION

This invention relates to the field of vehicle charging systems, and more particularly, this invention relates to a voltage regulator that regulates the output voltage of a vehicle charging system.

BACKGROUND OF THE INVENTION

In automotive charging systems used in automotive vehicles, such as cars, trucks and motorcycles, the charging system includes an alternator or generator with appropriate windings, armature and stator components. The alternator or generator typically uses a voltage regulator to regulate the charging voltage and output current to provide consistent operation during varying loads that would create voltage drops and other operational problems. Current state-of-the-art vehicle charging systems design the voltage regulator with either a discrete transistor or a custom integrated circuit known as an Application Specific Integrated Circuit (ASIC). These prior art voltage regulator circuits often were hard-wired circuits that defined a specific function for a specific type of vehicle.

Some automotive designs have attempted to delete the voltage regulator altogether and use enhanced microprocessor controllers as part of the ignition module or computer module that controls all functions of the car. Other vehicle designs have used voltage regulators with advanced microprocessor functions that maintain a regulated voltage produced by a generator, but include advanced clock and memory circuits that store battery and power supply reference data, battery voltage and generator rotation speed, and determine how much the battery is being charged and at what rate at any point in time.

These advanced systems are expensive and it would be desirable if a more simplified voltage regulator circuit design could be used, especially on older vehicles as replacements to charge the battery in an efficient, controlled manner without having complicated circuits and memories, as in some prior art devices.

SUMMARY OF THE INVENTION

It is therefore an object of the present invention to provide a voltage regulator that regulates the output voltage of a vehicle charging system that is simple, efficient, and inexpensive, and overcomes the disadvantages of the prior art.

In accordance with the present invention, a voltage regulator of the present invention regulates the output voltage of a vehicle charging system that uses an alternator or generator, and includes a field winding. The charging system is connected to a vehicle battery and vehicle devices for supplying voltage and recharging the battery and powering vehicle devices. In accordance with the present invention, the voltage regulator includes a microcontroller, which is operative for monitoring the output voltages representative of monitored load changes within the vehicle. A power output circuit of the voltage regulator is controlled by the microcontroller and operatively connects to a field winding and battery. The microcontroller is operative for changing the field duty cycle of the generator or alternator by turning ON and OFF the power output circuit in a predetermined manner as established by the microcontroller based on monitored load changes within the vehicle. The power output circuit preferably comprises a power output transistor, such as a field effect transistor, but could be an IGBTs or similar device.

In yet another aspect of the present invention, the microcontroller is operative for changing the load response of the alternator or generator based on monitored load changes within the vehicle and provide a full output voltage after a predetermined period of time. The microcontroller is also operative for changing the time period in which the alternator or generator responds to monitored load changes within the vehicle. The microcontroller is operative for monitoring the input frequency of the alternator or generator and setting an output response rate dependent on the input frequency.

In yet another aspect of the present invention, the microcontroller has an output pin operatively connected to an ignition line circuit for monitoring ignition power and an output pin operatively connected to an indicator light sensing line for monitoring an indicator light status. The voltage regulator can be mounted within an alternator housing or on the backside of an alternator housing.

In yet another aspect of the present invention, the voltage regulator includes a voltage step-up or doubler circuit operatively connected to the power output circuit and microcontroller. The voltage step-up circuit is controlled from a common pin of the microcontroller, such that the microcontroller measures voltage on a transistor or diode in the voltage step-up circuit to determine temperature changes.

A method aspect of the invention is also disclosed and comprises the steps of monitoring within a microcontroller of the voltage regulator the output voltage representative of monitored load changes, and changing the field duty cycle of the generator or alternator by turning ON and OFF in a predetermined manner a power output circuit of the voltage regulator that is connected to the battery and a field winding as established by the microcontroller based on monitored load changes within the vehicle.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
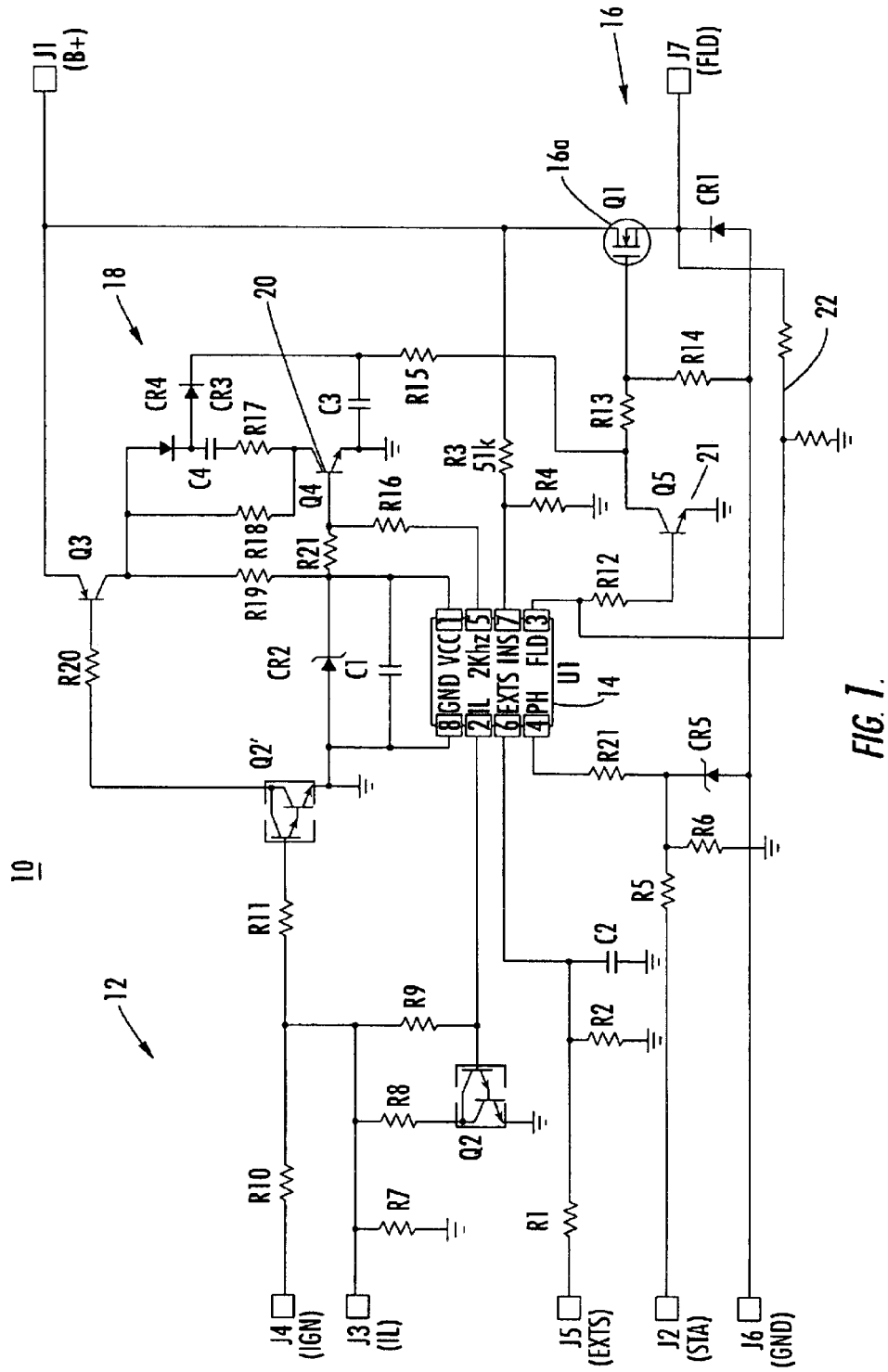
FIG. 1 is a schematic circuit diagram of a portion of a vehicle charging system and showing the microcontroller and associated circuit components of the voltage regulator of the present invention.

FIG. 1 is a schematic circuit diagram of a first embodiment of a portion of the charging system 10 of the present invention used for automotive vehicles and showing the circuit of the voltage regulator 12 in one aspect of the present invention. The charging system 10 is used for automotive vehicles, such as cars, trucks, and motorcycles. The charging system 10 includes an alternator or generator with appropriate windings, armature and stator components (not shown). The charging system 10 uses the voltage regulator of the present invention to control in an enhanced manner the charging voltage and output current.

Current state-of-the-art vehicle charging systems use a voltage regulator having either a discrete transistor or a custom integrated circuit known as an Application Specific Integrated Circuit (ASIC). These prior art voltage regulators often have hard-wired circuits to define a specific function for a specific vehicle. Some advanced vehicle charging systems use advanced microprocessors that avoid the use of a voltage regulator altogether or provide very complicated circuits that use involved memory to enhance charging system functions that add undue complexity to the overall charging system.

The present invention uses a simplified, inexpensive, and improved voltage regulator design, such as shown in the exemplary schematic circuit diagram of FIG. 1. A microcontroller 14 and, more particularly, an eight-pin microcontroller, as a non-limiting example, performs the voltage regulator function normally accomplished by comparators, operational amplifiers (OP-AMPS), digital circuits and Application Specific Integrated Circuits.

The voltage regulator 12 of the present invention, as shown in FIG. 1, can be used with an alternator, such as for DELCO replacement circuits. This voltage regulator 12 as illustrated can control the field switching current by monitoring the output of the battery voltage and controlling an appropriate output. When used with a direct current generator, the voltage regulator 12 can monitor the output voltage by typically controlling a silicon controlled rectifier (SCR) or metal oxide semiconductor field effect transistor (MOSFET) to set the output voltage.

Figure 2:
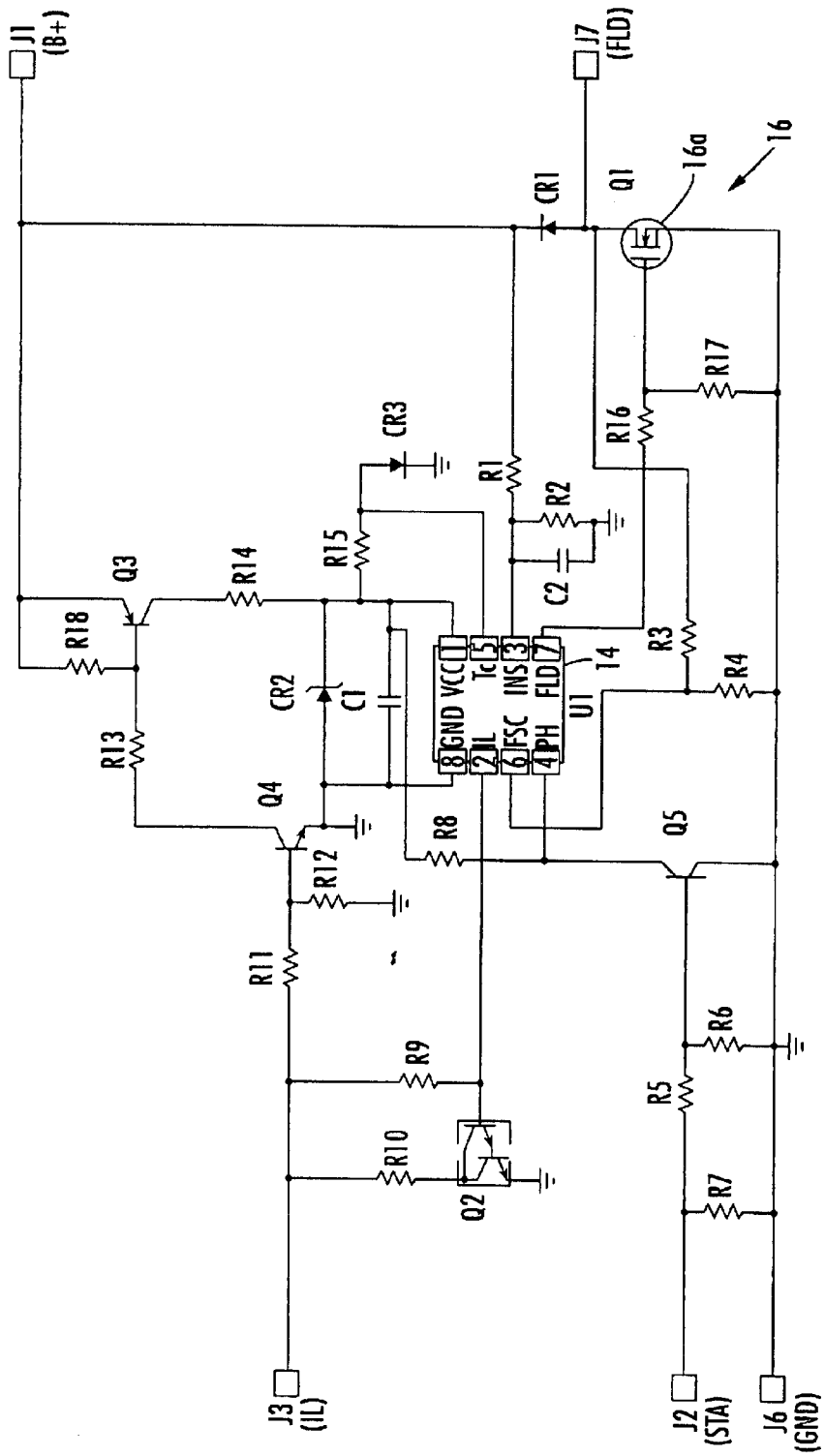
FIG. 2 is a second embodiment of the voltage regulator as shown in FIG. 1, but showing a different circuit configuration for the voltage regulator that does not include a voltage step-up circuit.
Figure 3:
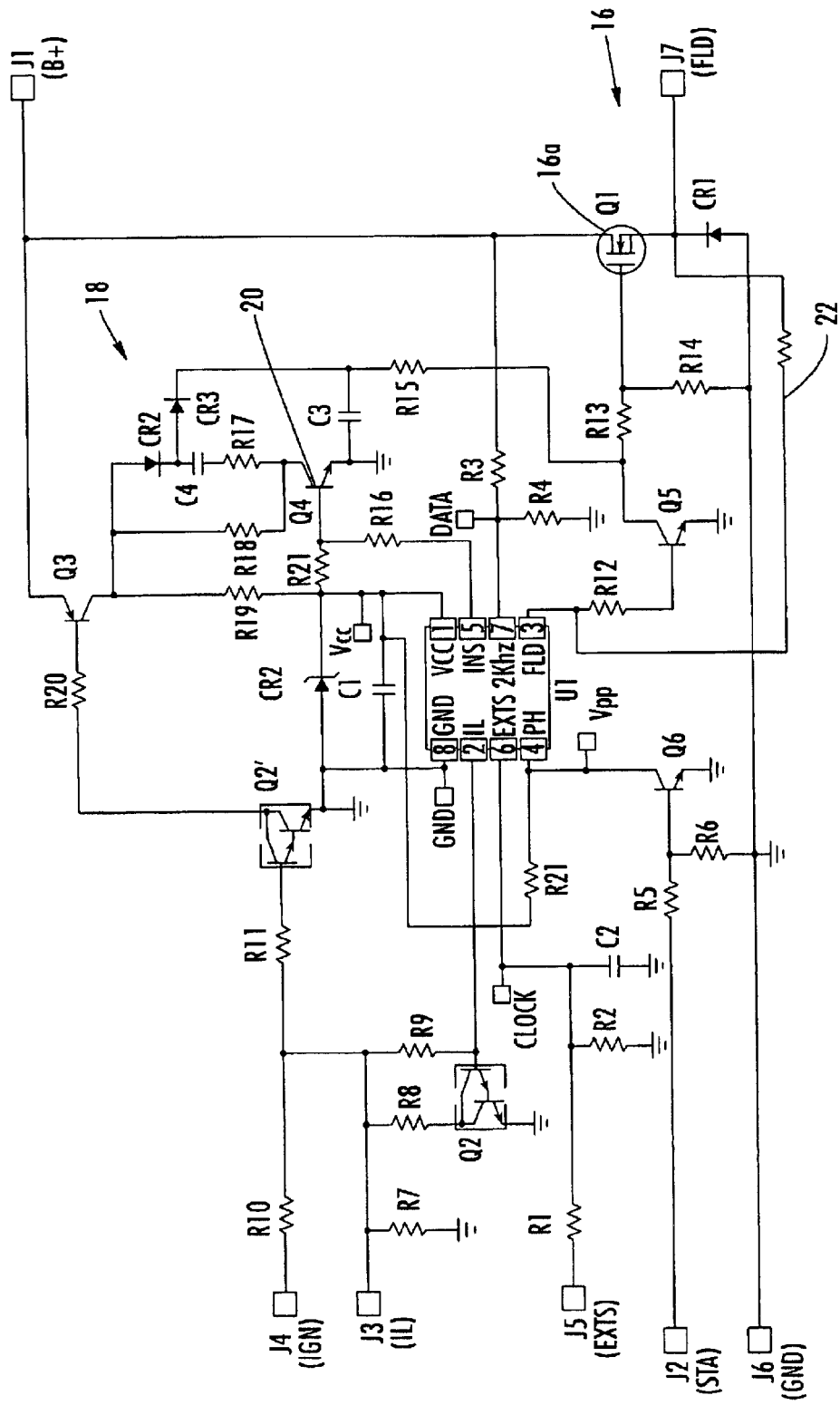
FIG. 3 is another schematic circuit diagram similar to FIG. 1, but showing programming terminals that can be used for programming the microcontroller used in the present invention.

There are numerous benefits of the present invention, such as by using the design shown in FIG. 1 (and also non-limiting embodiments as shown in FIGS. 2 and 3). The microcontroller 14 as an integral part of the voltage regulator controls the output voltage of an alternator or generator by providing a load response and changing the field duty cycle. Because a microcontroller is used, the programming software can be established to program a desired load response. The microcontroller turns ON and OFF a power output circuit 16 connected to the battery and field winding in a manner established by the microcontroller based on monitored changes in the load.

In the illustrated embodiment, the power output circuit 16 includes a power output transistor 16a formed preferably as a field effect transistor, but an IGBT or other power output device could be used. The microcontroller 14 is smaller than most typically designed Application Specific Integrated Circuits used with vehicle voltage regulators, and therefore, the overall configuration of the voltage regulator of the present invention is smaller than typical. The microcontroller could be positioned on a circuit board, include a housing and heat sinks, and therefore, it preferably is mounted in the alternator (or generator) or on the backside of the alternator (or generator) or other locations that are convenient. Although the microcontroller as a microprocessor is illustrated as an eight-pin microcontroller, other microcontrollers, such as a common 14-pin device, are also small and inexpensive and would allow miniaturization in the packaging for use in vehicle applications as described.

When used as a DC generator voltage regulator, the microcontroller could control the output voltage by turning ON and OFF any power output devices of the power output circuit 16, which could also include silicon controlled rectifiers (SCR's) and field effect transistors (FET's) and other similar electronic, transistor devices. As noted before, the microcontroller as part of the voltage regulator can be mounted inside the generator or mounted on its backside.

In yet another aspect of the present invention, the microcontroller as an integral part of the voltage regulator can create a soft-start function. Thus, the microcontroller is operative for increasing the duty cycle of any switching element, such as a power output transistor 16a, to a normal operating point during start-up. The output of the power output transistor 16a could be at about 30% as a non-limiting example (or other values) when the ignition is first turned on and increased in a soft-start manner.

The voltage regulator of the present invention creates a load response function based on monitored load changes and provides a full output voltage after a predetermined period of time. For example, depending on the type of vehicle and the type of devices used in the vehicle, the load response could vary, having full output in 2, 4, 20 or longer seconds as non-limiting examples. As will be explained below, the circuit shown in FIG. 1 also provides a voltage step-up function to drive the power output circuit 16, such as by preferably using a power field effect transistor (FET) 16a. The microcontroller 14 also monitors the temperature of the voltage regulator 12 by sampling a diode forward voltage (FIG. 2) or transistor voltage (FIG. 1), and uses this information to set an alternator temperature compensation as will also be explained below. It thus can limit the peak operating temperature and account for fluctuations in supply voltages in real time.

In the embodiment of FIG. 1, the microcontroller 14 "turns on" the power output transistor 16a by a stepped-up voltage via a voltage "step-up" or "doubler circuit" 18 using a step-up or doubler transistor 20. The microcontroller measures the transistor junction voltage of the step-up transistor 20 when in the ON condition by a preferred single pin from the microcontroller. A preferred single output pin on the microcontroller 14 can also be used for driving a driver transistor 21 that turns ON and OFF the power output transistor 16a, while also monitoring the field current and providing a short-circuit function using a short circuit line 22.

The microcontroller 14 can include an analog-to-digital converter that monitors and controls the voltage. The microcontroller 14 can be implemented such that it can be programmed and calibrated in a single electronic operation. In another very beneficial aspect of the present invention, the microcontroller 14 monitors the (phase) input frequency, such as on a stator, and by using one of its pins, sets the output response rate dependent on the frequency.

Although the type of microcontroller that is selected can vary depending on the circuit requirements and selected design configuration, the microcontroller used in the illustrated circuit is a microcontroller manufactured by Microchip under the designation PIC12F675-E/SM. In this preferred embodiment, the microcontroller is an eight-pin microcontroller that uses less board space than a comparable Application Specific Integrated Circuit (ASIC). It includes an analog-to-digital converter (ADC), on-board EEPROM, Programmable Low Voltage Detect circuit (PLVD), a Brown-Out Reset (BOR), and a comparator. It is designed functionally using high performance RISC architecture. This type of microcontroller enables a system designer to perform a required embedded control function with ease.

As illustrated in the circuit shown in FIG. 1, the voltage regulator 12 includes terminals J1-J7 that are part of the connection terminals for the voltage regulator package that typically includes a circuit board or other circuit mounting substrate and having the microcontroller 14 and other components mounted thereon. Terminal J1 is a B+ battery terminal and terminal J7 connects to the field winding.

Terminal J4 connects to an ignition switch line and terminal J3 connects to an indicator light sensing line. Thus, terminals J3 and J4 are functional in the microcontroller such that the ignition or lights can be used for turning ON the voltage regulator circuit and microcontroller functions. It should be noted that some vehicles have both an indicator light sensing line and ignition switch line in parallel and some do not. Terminal J5 connects to an external sensing line and is functionally similar to a remote sensor, for example, as a small sensing wire that extends to the battery to monitor the voltage at the battery and the output of the alternator or generator. Terminal J2 connects to the stator of the alternator and terminal J6 is connected to ground in this particular embodiment.

The illustrated microcontroller in this non-limiting embodiment includes eight pins, numbered 1–8. Although the description will proceed relative to one functional operation of the pins, different pin configurations of the present invention can be used in accordance with the present invention. Pin 1 is identified as VCC and used for connection to the circuit and "reading" or monitoring the voltage. Pin 2 is identified as IL, corresponding to the indicator light sensing line connection and connects through the Darlington transistor pair Q2 to terminal J3. Pin 3 (FLD) indicates the connection to the field terminal via the driver transistor Q5 21 that is operable to turn ON and OFF the power output transistor Q1 16a. As noted before, the resistor-to-ground circuit line 22 provides enhanced control and allows a short-circuit function for the driver transistor 21 that drives power output transistor Q1, 16a.

Pin 4 (PH) is operable as a phase input pin for determining phase of the alternator or generator and operably connected to the station terminal J4 and the ground connection. Pin 5 (2 KHz) is an oscillator pin used for connection to that portion of the voltage regulator circuit functioning as a voltage "step-up" or "doubler" circuit 18 having a voltage step-up transistor 20 that steps-up voltage to the power output transistor 16a, which, in the illustrated embodiment, is configured in a high voltage side configuration, such as about 24 volts in one non-limiting example. This pin can also be used for reading the voltage on the step-up transistor 20 and also determining temperature fluctuations via voltage changes. The step-up transistor 20 is illustrated as a single bipolar transistor, but it could also be a Darlington transistor pair or other device.

Pin 6 (EXTS) is an external sensor pin for connecting to an external sensing line such as for monitoring voltage. Pin 7 (INS) is the internal sensor pin that connects to a sensing circuit line that monitors the output of the alternator. Pin 8 (GND) is the ground pin and connects to ground via Darlington transistor pair Q2' and to both J3 and J4 terminals.

The power output transistor 16a is labeled Q1 and connected to driver transistor Q5 21 that biases the output transistor and turns ON and OFF the power output transistor Q1 16a. As illustrated in FIG. 1, this embodiment of the power output transistor Q1 is configured in a high voltage side drive configuration, and thus, requires the voltage step-up or doubler circuit 18, as illustrated by the "step-up" or "doubler" transistor Q4 20 and diodes CR3 and CR4, which are operative with capacitors C4, R17 and C3.

This voltage step-up circuit 18 provides the doubled voltage to power output transistor Q1 16a. The voltage step-up circuit 18 is necessary in this particular embodiment because the microcontroller 14 is a low voltage device (such as 3 or 5 volts as non-limiting examples) and in the illustrated high voltage side configuration, a high voltage, for example, 24 volts as a non-limiting example, is required. Battery voltage is about 12 to about 14 volts and the step-up or doubler circuit 18 is required to provide the necessary voltage to the gate of power output transistor Q1.

Step-up or doubler transistor Q4 20 is illustrated as a bipolar transistor, but as noted before, could be a Darlington transistor pair or other configuration. The step-up transistor Q4 20 is biased ON and OFF via pin 5 representative of the 2 KHz oscillator pin that outputs the preferred oscillator signal. This pin 5 also is not only used for the programmed oscillator signal for voltage doubling, but also "reads" or monitors the voltage at the step-up transistor Q4 to determine any temperature changes. As the temperature increases or decreases, the biasing voltage of step-up transistor Q4 changes. The amount of change in the biasing voltage is indicative of change in temperature.

The internal sensor pin 7 (INS) is connected via voltage divider R3 and R4 to battery terminal J1 (B+) and power output transistor Q1 and senses output of the alternator. External sensor pin 6 is connected via capacitor C2 (used for filtering the signal) and voltage divider circuit formed from resistors R1 and R2 to the external sensor terminal J5 for sensing various operating conditions, including voltage changes. Microcontroller pin 2 (IL) is connected via Darlington transistor pair Q2 and voltage divider circuit R10, R7, R8 and R9 to the ignition terminal J4 and the indicator light terminal J3. The ignition terminal J4 is also connected to transistor Q2', which could be a Darlington transistor pair or a single transistor. The emitter of the Darlington transistor pair Q2' is connected to the ground pin 8 (GND) of the microcontroller 14. The output of the Darlington transistor pair Q2' connects to transistor Q3. The phase pin 4 (PH) of the microcontroller 14 is operatively connected by voltage divider circuit R5, R6, Zener diode CR5 and end line resistor R21 to the ground terminal J6 and the stator terminal J2. This pin function allows the microcontroller to monitor the stator (or phase input frequency) and set an output response rate that is dependent on the frequency. Other illustrated components are operative with the circuit.

FIG. 2 illustrates another non-limiting embodiment of the voltage regulator 12 used in charging systems for vehicles. The circuit of this voltage regulator and charging system does not include an ignition terminal J4, such as used in the previous voltage regulator circuit shown in FIG. 1. The external sensor terminal J5 also is not used. The Darlington transistor pair Q2' has been substituted for use by a single transistor Q4. Because there is no high voltage side drive for the power output transistor Q1, the voltage step-up circuit 18 and previous step-up transistor Q4 20 in FIG. 1 is not required. Some pin terminal connections used in the microcontroller are programmed differently, such as pin 6 (FSC), which connects to the field coil to "look up," i.e., monitor the field and "sense" or "detect" it. Pin 5 (Tc) is a temperature compensation pin that determines voltage on a diode CR3 and determines the temperature based upon the monitored voltage, as compared to the circuit of FIG. 1, where the voltage step-up or doubler transistor 20 is monitored to determine temperature changes. Other components are similarly configured with slight modifications. Transistor Q5 is connected to Vcc ground pin 1 and J2 stator terminal for reading the stator phase and thus has an output also connected to pin 4 for the phase reading, as illustrated.

FIG. 3 illustrates another schematic circuit diagram similar to that shown FIG. 1, but also showing modifications in the microcontroller pin connections and showing five additional programming terminals labeled ground (GND), VCC, Data, VPP and Clock that are used for programming the microcontroller. The VCC programming terminal connects to the power supply. The VPP programming terminal is a programming pin and typically about 10 volts is applied to the terminal pin to program the microcontroller. The data terminal is used for programming and the clock terminal for clocking pulses. The ground terminal is used for grounding.

By downloading a slightly different program, one circuit, as shown in FIGS. 1–3, can be used for different applications and different types of charging systems. It is also possible the circuit could be programmed for self-calibration and resistors would not have to be trimmed such as necessary with some voltage regulators using application specific integrated circuits.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A voltage regulator that regulates the output voltage of a vehicle charging system having an alternator or generator and field winding and connected to a vehicle battery and vehicle devices for supplying a voltage and recharging the battery and powering vehicle devices comprising:
    a microcontroller operative for monitoring output voltages representative of monitored load changes of the vehicle; and
    a power output circuit controlled by the microcontroller and that connects to a field winding of the vehicle wherein the microcontroller is operative for changing the field duty cycle of the generator or alternator by turning ON and OFF the power output circuit in a predetermined manner as established by the microcontroller based on monitored load changes within the vehicle.

2. A voltage regulator according to claim 1, wherein the microcontroller is operative for changing the load response of the alternator or generator based on monitored load changes to provide a full output voltage after a predetermined period of time.

3. A voltage regulator according to claim 2, wherein the microcontroller is operative for changing the time period in which the alternator or generator responds to monitored load changes.

4. A voltage regulator according to claim 1, wherein the microcontroller is operative for monitoring the input frequency of the alternator or generator and setting an output response rate dependent on the input frequency.

5. A voltage regulator according to claim 1, wherein the microcontroller has an output pin operatively connected to vehicle ignition for monitoring vehicle ignition power and an output pin operatively connected to a vehicle indicator light for monitoring a vehicle indicator light.

6. A voltage regulator according to claim 1, wherein the power output circuit comprises a power output transistor.

7. A voltage regulator according to claim 1, and further comprising a diode or transistor operatively connected to said microcontroller, wherein voltage is measured on the diode or transistor to determine changes in temperature within the voltage regulator, wherein the field duty cycle is also changed based on changes in temperature.

8. A voltage regulator that regulates the output voltage of a vehicle charging system having an alternator or generator and field winding and connected to a vehicle battery and vehicle devices for supplying a voltage and recharging the battery and powering vehicle devices comprising:
    a microcontroller operative for monitoring output voltages representative of monitored load changes of the vehicle;
    a power output circuit operatively connected to a field winding, vehicle battery and controlled by said microcontroller and operable within the voltage regulator in a high voltage side drive configuration; and
    a voltage step-up circuit operatively connected to the power output circuit and microcontroller and controlled from a common pin of the microcontroller such that the microcontroller measures voltage on the step-up circuit for determining temperature changes, wherein said microcontroller is operative for changing the field duty cycle of the generator or alternator by turning ON and OFF the power output circuit in a predetermined manner as established by the microcontroller based on monitored load changes and temperature fluctuations.

9. A voltage regulator according to claim 8, wherein the microcontroller is operative for changing the load response of the alternator or generator based on monitored load changes to provide a full output voltage after a predetermined period of time.

10. A voltage regulator according to claim 9, wherein the microcontroller is operative for changing the time period in which the alternator or generator responds to monitored load changes.

11. A voltage regulator according to claim 8, wherein the microcontroller is operative for monitoring the input frequency of the alternator or generator and setting an output response rate dependent on the input frequency.

12. A voltage regulator according to claim 8, wherein the microcontroller has an output pin operatively connected to vehicle ignition for monitoring ignition power and an output pin operatively connected to a vehicle indicator light for monitoring a vehicle indicator light.

13. A voltage regulator according to claim 8, wherein the power output circuit comprises a power output transistor.

14. A voltage regulator according to claim 13, wherein the power output transistor comprises a field effect transistor.

15. A method of regulating the output voltage of a vehicle charging system having an alternator or generator and a voltage regulator and connected to a vehicle battery and vehicle devices for supplying a voltage for recharging the battery and powering vehicle devices comprising the steps of:
    monitoring within a microcontroller of the voltage regulator the output voltage representative of monitored load changes within the vehicle; and
    changing the field duty cycle of the generator or alternator by turning ON and OFF a power output circuit of the voltage regulator that is connected to the battery and a field winding in a predetermined manner as established by the microcontroller based on monitored load changes.

16. A method according to claim 15, and further comprising the step of changing the load response of the alternator or generator based on monitored load changes to provide a full output voltage after a predetermined period of time.

17. A method according to claim 16, and further comprising the step of changing the time period in which the alternator or generator responds to monitored load changes.

18. A method according to claim 15, and further comprising the step of sensing voltage changes within the voltage regulator to determine temperature changes within the voltage regulator and changing the field duty cycle based on the changes in temperature.

19. A method according to claim 15, and further comprising the step of monitoring the input frequency of the alternator or generator and setting an output response rate dependant on the input frequency.

20. A method according to claim 15, wherein the power output circuit comprises a power output transistor.

21. A method according to claim 20, wherein the power output transistor comprises a field effect transistor.

22. A method of regulating the output voltage of a vehicle charging system having an alternator or generator and a voltage regulator and connected to a vehicle battery and vehicle devices for supplying a voltage for recharging the battery and powering vehicle devices comprising the steps of:
monitoring within a microcontroller of the voltage regulator the output voltage representative of vehicle load changes by sensing battery voltage with the microcontroller;
powering a power output circuit connected to a field winding and configured in a high voltage side configuration from a voltage step-up circuit connected and controlled from a common pin of the microcontroller that controls the voltage step-up circuit and measures voltage on the step-up circuit to determine temperature changes; and
changing the field duty cycle of the generator or alternator by turning ON and OFF the power output circuit connected to the battery and field winding in a predetermined manner as established by the microprocessor based on monitored load changes and temperature fluctuations.

23. A method according to claim 22, and further comprising the step of changing the load response of the alternator or generator based on monitored load changes in the vehicle to provide a full output voltage after a predetermined period of time.

24. A method according to claim 23, and further comprising the step of changing the time period in which the alternator responds to monitored load changes within the vehicle.

25. A method according to claim 22, and further comprising the step of monitoring the input frequency of the alternator or generator from the microcontroller and setting an output response rate dependant on the input frequency.

26. A method according to claim 22, wherein the power output circuit comprises a power output transistor.

27. A method according to claim 22, wherein the power output transistor comprises a field effect transistor.

28. A method according to claim 22 and further comprising the step of measuring voltage in a diode or transistor of the voltage step-up circuit to determine temperature fluctuations.

29. A voltage regulator that regulates the output voltage of a vehicle charging system having an alternator or generator and field winding and connected to a vehicle battery and vehicle devices for supplying a voltage and recharging the battery and powering vehicle devices comprising:
a microcontroller operative for monitoring the duty cycle of an input signal representative of load changes of the vehicle; and
a power output circuit controlled by the microcontroller and that connects to a field winding of the vehicle wherein the microcontroller is operative for changing a set point voltage and controlling the generator or alternator.

30. A voltage regulator according to claim 29, wherein the microcontroller is operative for changing the load response of the alternator or generator based on monitored load changes to provide a full output voltage after a predetermined period of time.

31. A voltage regulator according to claim 30, wherein the microcontroller is operative for changing the time period in which the alternator or generator responds to monitored load changes.

32. A voltage regulator according to claim 29, wherein the microcontroller is operative for monitoring the input frequency of the alternator or generator and setting an output response rate dependent on the input frequency.

33. A voltage regulator according to claim 29, and further comprising a diode or transistor operatively connected to said microcontroller, wherein voltage is measured on the diode or transistor to determine changes in temperature within the voltage regulator, wherein the field duty cycle is also changed based on changes in temperature.

34. A voltage regulator according to claim 29, wherein the power output circuit is operative for changing the field duty cycle of the generator or alternator based on the set point voltage.

35. A method of regulating the output voltage of a vehicle charging system having an alternator or generator and a voltage regulator and connected to a vehicle battery and vehicle devices for supplying a voltage for recharging the battery and powering vehicle devices comprising the steps of:
monitoring within a microcontroller of the voltage regulator the duty cycle of an input signal representative of load changes of the vehicle; and
changing a set point voltage for controlling the generator or alternator.

36. A method according to claim 35, and further comprising the step of changing the load response of the alternator or generator based on monitored load changes to provide a full output voltage after a predetermined period of time.

37. A method according to claim 36, and further comprising the step of changing the time period in which the alternator or generator responds to monitored load changes.

38. A method according to claim 35, and further comprising the step of sensing voltage changes within the voltage regulator to determine temperature changes within the voltage regulator and changing the field duty cycle based on the changes in temperature.

39. A method according to claim 38, and further comprising the step of monitoring the input frequency of the alternator or generator and setting an output response rate dependant on the input frequency.

40. A method according to claim 35, and further comprising the step of changing a set point voltage of a power output circuit and changing the field duty cycle of the generator or alternator.

* * * * *